United States Patent
Silvasi

(10) Patent No.: US 6,626,579 B1
(45) Date of Patent: Sep. 30, 2003

(54) ANTI-CORROSION MEMBER FOR USE IN A VEHICLE WHEEL END ASSEMBLY HAVING AN ALUMINUM STEERING KNUCKLE

(75) Inventor: Michael L. Silvasi, Dexter, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/062,282

(22) Filed: Jan. 31, 2002

(51) Int. Cl.[7] ............................................. F16C 19/08
(52) U.S. Cl. ........................ 384/476; 384/537; 384/544
(58) Field of Search ................................. 384/476, 544, 384/589, 537, 584

(56) References Cited

U.S. PATENT DOCUMENTS 6,017,097 A * 1/2000 Weir, III ..................... 384/589
2002/0025093 A1 * 2/2002 Sahashi et al. ............. 384/544
2003/0048966 A1 * 3/2003 Nomura et al. ............. 384/544

* cited by examiner

Primary Examiner—Lenard A. Footland
(74) Attorney, Agent, or Firm—MacMillan, Sobanski & Todd, LLC

(57) ABSTRACT

This invention relates to an anti-corrosion member adapted for use in a vehicle wheel end assembly vehicle wheel end assembly. The vehicle wheel end assembly includes a bearing unit formed from steel and including a pilot surface and a steering knuckle formed from aluminum and having a portion supported on the pilot surface of the bearing unit. The assembly further includes an anti-corrosion member disposed on the pilot surface of the bearing unit so as to be interposed between the bearing unit and the portion of the steering knuckle when assembled so as to prevent direct contact therebetween whereby galvanic corrosion between the steel bearing unit and the aluminum steering knuckle is prevented. The anti-corrosion member can be formed from plastic or formed from metal and coated with an anti-corrosive material.

20 Claims, 5 Drawing Sheets

ANTI-CORROSION MEMBER FOR USE IN A VEHICLE WHEEL END ASSEMBLY HAVING AN ALUMINUM STEERING KNUCKLE

BACKGROUND OF THE INVENTION

This invention relates in general to vehicle wheel end assemblies having aluminum steering knuckles and in particular to an anti-corrosion member adapted for use in such a vehicle wheel end assembly.

One example of a known vehicle wheel end assembly, indicated generally at 10, is illustrated in prior art FIG. 1. As shown therein, the prior art vehicle wheel end assembly 10 is associated with a front driven wheel (not shown) of a vehicle and includes a wheel hub 12, a bearing unit 14, a steering knuckle 16, and a brake rotor 18, and a dust shield 20.

The wheel hub 12 includes internal splines 12A for matingly receiving external splines of the axle spindle (not shown) for connecting the wheel hub 12 to the axle spindle for rotation therewith. The wheel hub 12 also includes a generally radially outwardly extending flange 12B, and a stepped bearing seat 12C. The wheel hub flange 12B includes a plurality of circumferentially spaced stud receiving holes 12D formed therein (only one of such stud receiving holes 12D is illustrated in prior art FIG. 1). The stud receiving holes 12D are adapted to receive studs 24 (only one of such studs 24 is illustrated in prior art FIG. 1), and nuts (not shown) for securing a rotatable brake component, such as for example the brake rotor 18 or a brake drum (not shown), and a vehicle wheel (not shown), to the wheel hub 12 for rotation therewith.

The bearing unit 14 is carried by the wheel hub 12 and includes a generally radially outwardly extending flange 14A. The bearing unit flange 14A includes a plurality of circumferentially spaced threaded mounting bolt receiving holes 14B formed therein (only one of such mounting bolt receiving holes 14B is illustrated in prior art FIG. 1). The mounting bolt receiving holes 14B are adapted to receive threaded ends of mounting bolts 22, which extend through corresponding openings 16A provided in the steering knuckle 16 and corresponding openings (not shown) provided in the dust shield 20, for securing the bearing unit flange 14A to the steering knuckle 16. Alternatively, the dust shield 20 can be attached by other suitable methods. Also, in some instances, the a dust shield 20 is not utilized.

When the bearing unit 14 is secured to the steering knuckle 16, a first outer surface 14C of the bearing unit 14 is disposed adjacent an outer surface 16C of the steering knuckle 16, and a second outer surface 14D of the bearing unit 14 is disposed adjacent an outer surface 20D of the dust shield 20. Alternatively, if a dust shield is not used, the outer surface 14D of the bearing unit is disposed adjacent an outer surface 16D of the steering knuckle 16.

Typically, the steering knuckle 16 is formed from cast iron and the bearing unit 14 is formed from steel. To reduce the weight of the assembly, it is known to form the steering knuckle 16 from aluminum. Unfortunately, when the steering knuckle 16 is formed from aluminum, galvanic corrosion can occur between the aluminum steering knuckle 16 and the steel bearing unit 14 at the respective adjacent surfaces 16C and 14C and 16D and 14D (if the dust shield 20 is not used); or if the dust shield 20 is used, galvanic corrosion can occur between the aluminum steering knuckle 16 and the bearing unit 14 and the dust shield 20 at the respective surfaces 16C and 14C and 14D and 20D. Such galvanic corrosion is undesirable because if the bearing 14 needs to be replaced, the galvanic corrosion can make it very difficult to remove the bearing unit 14 without causing damage to the steering knuckle 16.

To prevent the galvanic corrosion from occurring, it is known to coat the surfaces 14C and 14D of the bearing unit 14 (if the dust shield is not used); or if the dust shield is used, to coat the surface 14C of the bearing unit 14 and at least the surface 20D of the dust shield 20 with an anti-corrosive coating material, such as for example, paint, an E-coat, a powder paint or plating. However, the cost to coat the associated surfaces 14C and 14D of the bearing unit 14 with the above anti-corrosive coating is rather expensive since this is done after machining of these surfaces of the bearing unit 14. Thus, it would be desirable to provide an improved structure for a vehicle wheel end assembly which prevents galvanic corrosion between the aluminum steering knuckle and the steel bearing unit and yet is simple and inexpensive.

SUMMARY OF THE INVENTION

This invention relates to an anti-corrosion member adapted for use in a vehicle wheel end assembly vehicle wheel end assembly. The vehicle wheel end assembly includes a bearing unit formed from steel and including a pilot surface and a steering knuckle formed from aluminum and having a portion supported on the pilot surface of the bearing unit. The assembly further includes an anti-corrosion member disposed on the pilot surface of the bearing unit so as to be interposed between the bearing unit and the portion of the steering knuckle when assembled so as to prevent direct contact therebetween whereby galvanic corrosion between the steel bearing unit and the aluminum steering knuckle is prevented. The anti-corrosion member can be formed from plastic or formed from metal and coated with an anti-corrosive material.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
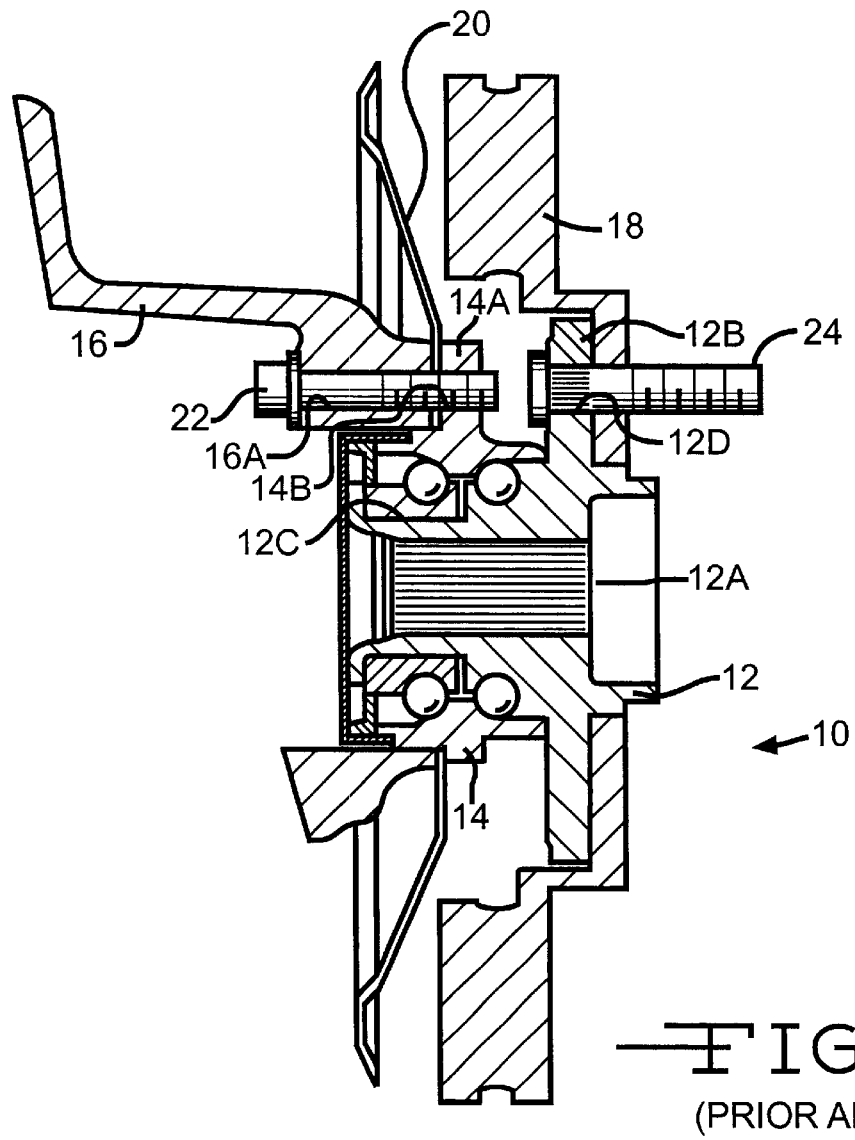
FIG. 1 is a sectional view of a portion of a prior art vehicle wheel end assembly.
Figure 2:
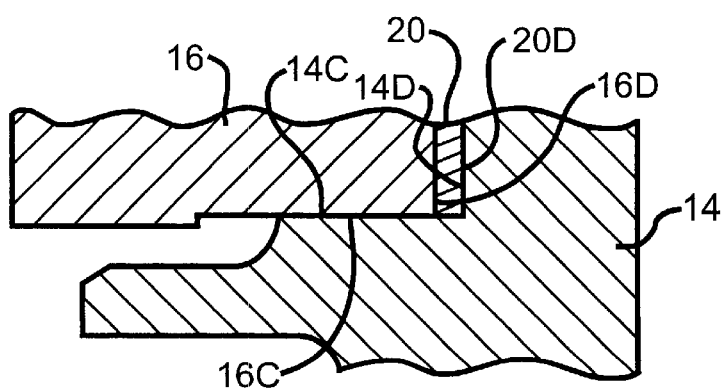
FIG. 2 is an enlarged view of a portion of the prior art vehicle wheel end assembly illustrated in FIG. 1.
Figure 3:
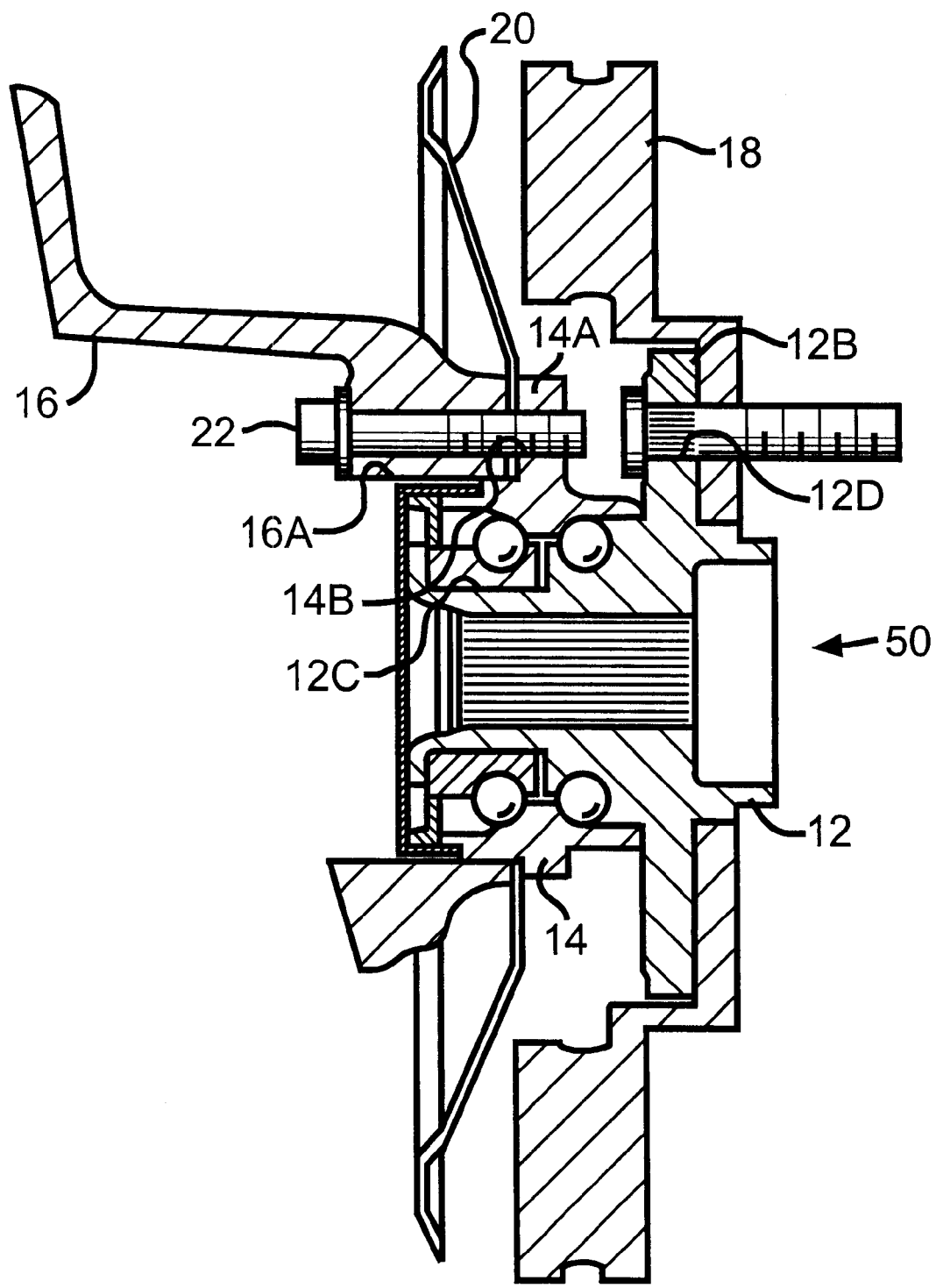
FIG. 3 is a sectional view of a portion of a first embodiment of a vehicle wheel end assembly constructed in accordance with this invention.
Figure 4:
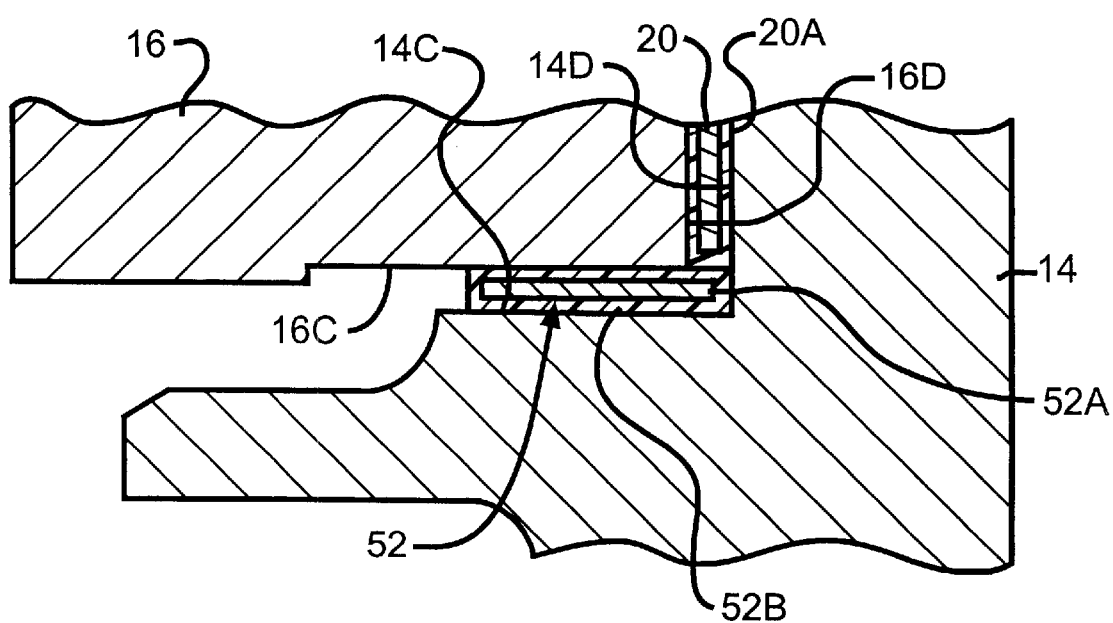
FIG. 4 is an enlarged view of a portion of the first embodiment of the vehicle wheel end assembly illustrated in FIG. 3.

Referring now to FIGS. 3 and 4 and using like reference numbers to indicate corresponding parts, there is illustrated a first embodiment of a vehicle wheel end assembly, indicated generally at 50, in accordance with this invention. The illustrated vehicle wheel end assembly 50 is associated with a front driven wheel (not shown) of a vehicle. The general structure and operation of the vehicle wheel end assembly 50 is conventional in the art. Thus, only those portions of the vehicle wheel end assembly 50 which are necessary for a full understanding of this invention will be explained and illustrated in detail. Also, although this invention will be described and illustrated in connection with the particular vehicle wheel assembly 50 disclosed herein, it will be appreciated that this invention may be used in connection with other vehicle wheel end assemblies and also with other vehicle chassis components where galvanic corrosion is a concern.

The illustrated vehicle wheel end assembly 50 includes the wheel hub 12, the steel bearing unit 14, the aluminum steering knuckle 16, the brake rotor 18, the dust shield 20, and an annular ring or member 52. The ring 52 is interposed between the outer surface 14C of the bearing unit 14 and the outer surface 16C of the steering knuckle 16 The ring 52 can be disposed on either the surface 14C of the bearing unit 14 or the surface 16C of the steering knuckle 16 in a press-fit relationship or a slip-fit relationship. Preferably, the ring 52 is press-fit onto the surface 14C of the bearing unit 14.

In the illustrated embodiment, the ring 52 includes a metal ring 52A which is coated with a suitable anti-corrosive coating material 52B. The ring 52A can be formed from steel, stainless steel, or galvanized steel, and the anti-corrosive coating material 52B can be an ecoat, a paint or a plating. Alternatively, as will be discussed below, the ring 52A can be formed from other suitable non-metal materials.

In the illustrated embodiment, the entire outer surface of the ring 52A is coated with the anti-corrosive coating material 52B. Alternatively, only selected surfaces of the ring 52A can be coated with the coating material 52B to prevent galvanic corrosion from occurring between the bearing unit 14 and the steering knuckle 16. Also, in this embodiment, the entire outer surface of the dust shield 20 is coated with an anti-corrosive coating material 20A. Alternatively, only selected surfaces of the dust shield 20 can be coated with the coating material 20A to prevent galvanic corrosion from occurring between the bearing unit 14 and the steering knuckle 16.

Figure 5:
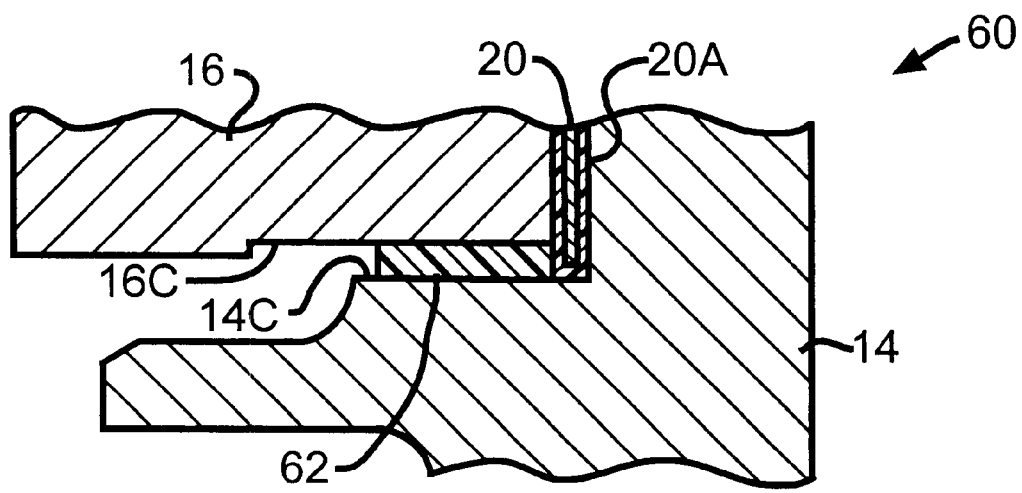
FIG. 5 is an enlarged view of a portion of a second embodiment of a vehicle wheel end assembly constructed in accordance with this invention.

Referring now to FIG. 5 and using like reference numbers to indicate corresponding parts, there is illustrated a second embodiment of a portion of a vehicle wheel end assembly, indicated generally at 60, in accordance with this invention. As shown in this embodiment, a ring 62 is interposed between the outer surface 14C of the bearing unit 14 and the outer surface 16C of the steering knuckle 16. The ring 62 can be disposed on either the surface 14C of the bearing unit 14 or the surface 16C of the steering knuckle 16 in a press-fit relationship or a slip-fit relationship. Preferably, the ring 62 is press-fit onto the surface 14C of the bearing unit 14. In this embodiment, the ring 62 is formed from a suitable plastic material, such as for example, from polyvinyl chloride (PVC) or polyethylene terephthalate (PET). Alternatively, the ring 62 can be formed from a suitable metal material and coated on the entire outer surface thereof or selectively coated.

Figure 6:
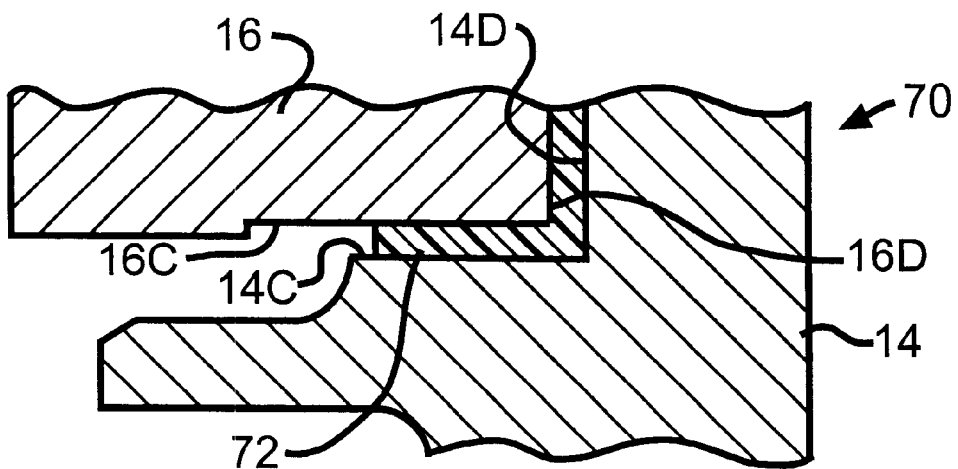
FIG. 6 is an enlarged view of a portion of a third embodiment of a vehicle wheel end assembly constructed in accordance with this invention.

Referring now to FIG. 6 and using like reference numbers to indicate corresponding parts, there is illustrated a third embodiment of a portion of a vehicle wheel end assembly, indicated generally at 70, in accordance with this invention. In this embodiment, the vehicle wheel end assembly 70 preferably does not include a dust shield.

As shown in this embodiment, a ring 72 is interposed between the outer surface 14C of the bearing unit 14 and the outer surface 16C of the steering knuckle 16, and the outer surface 14D of the bearing unit 14 and the outer surface 16D of the steering knuckle 16. The ring 62 can be press-fit or slip-fit onto the bearing unit 14 or the steering knuckle 16. Preferably, the ring 62 is press-fit onto the bearing unit 14. In this embodiment, the ring 62 is generally an L-shaped ring and is formed from a suitable plastic material. Alternatively, the ring 72 can be formed from a suitable metal material and coated on the entire outer surface thereof or selectively coated.

Figure 7:
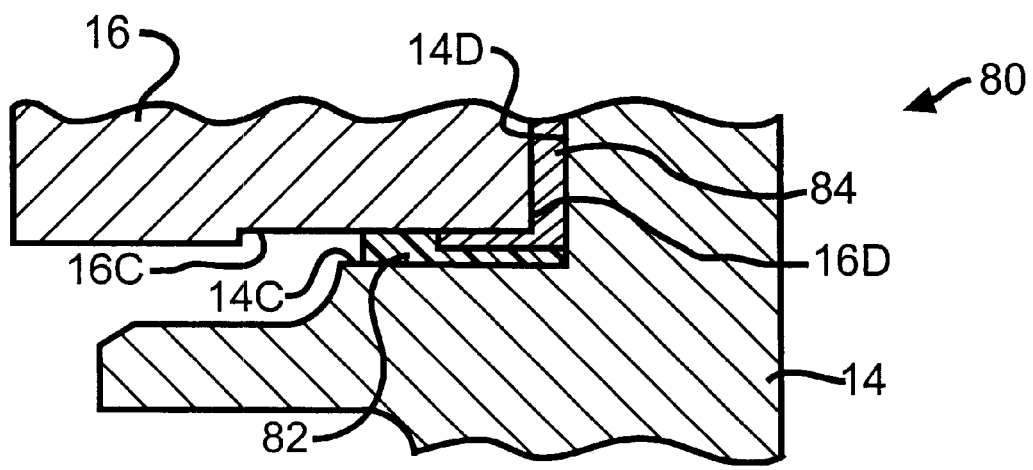
FIG. 7 is an enlarged view of a portion of a fourth embodiment of a vehicle wheel end assembly constructed in accordance with this invention.

Referring now to FIG. 7 and using like reference numbers to indicate corresponding parts, there is illustrated a fourth embodiment of a portion of a vehicle wheel end assembly, indicated generally at 80, in accordance with this invention. In this embodiment, the vehicle wheel end assembly 80 preferably does not include a dust shield.

As shown in this embodiment, a first ring 82 is interposed between the outer surface 14C of the bearing unit 14 and the outer surface 16C of the steering knuckle 16, and a second ring 84 is interposed between the outer surface 14D of the bearing unit 14 and the outer surface 16D of the steering knuckle 16. Preferably, the first and second rings 82 and 84 are generally L-shaped rings and are formed from a suitable plastic material. Alternatively, one or both of the rings 82 and 84 can be formed from a suitable metal material and coated on the entire outer surface thereof or selectively coated. Also, in this embodiment, the second ring 84 could function as a dust shield if so desired.

Figure 8:
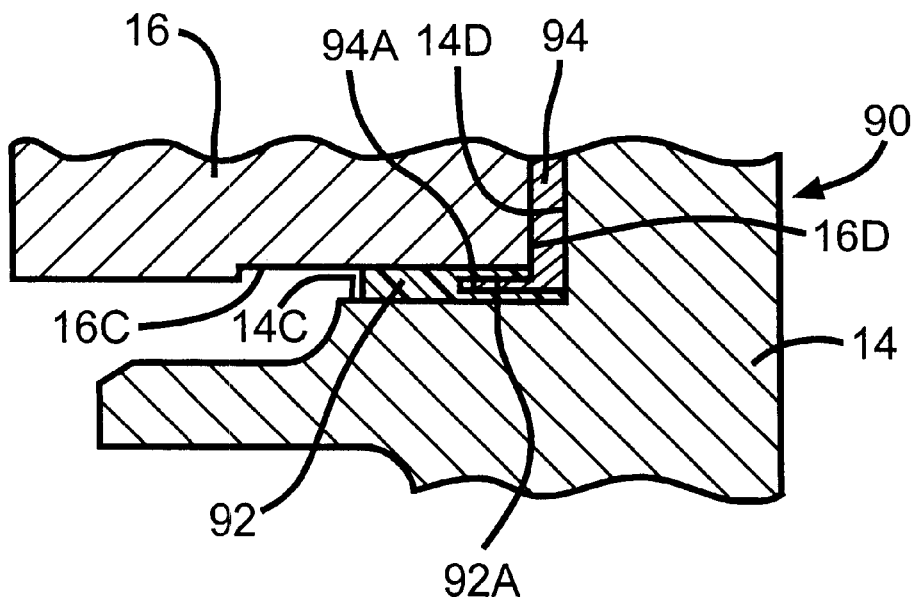
FIG. 8 is an enlarged view of a portion of a fifth embodiment of a vehicle wheel end assembly constructed in accordance with this invention.

Referring now to FIG. 8 and using like reference numbers to indicate corresponding parts, there is illustrated a fifth embodiment of a portion of a vehicle wheel end assembly, indicated generally at 90, in accordance with this invention. In this embodiment, the vehicle wheel end assembly 90 preferably does not include a dust shield.

As shown in this embodiment, a first ring 92 is interposed between the outer surface 14C of the bearing unit 14 and the outer surface 16C of the steering knuckle 16, and a second ring 94 is interposed between the outer surface 14D of the bearing unit 14 and the outer surface 16D of the steering knuckle 16. Preferably, the first and second rings 82 and 84 are generally L-shaped rings and are formed from a suitable plastic material.

The first ring 92 includes a slot or recess 92A formed therein to receive an end or projection 94A of the second ring 94. The projection 94A can be received in the slot 92A in a press-fit relationship or can be glued in place if so desired. Alternatively, one or both of the rings 92 and 94 can be formed from a suitable metal material and coated on the entire outer surface thereof or selectively coated. Also, in this embodiment, the second ring 94 could function as a dust shield if so desired.

One advantage of this invention is that the ring or rings prevent galvanic corrosion from occurring between the aluminum steering knuckle 16 and the bearing unit 14. Also, the ring can be made of sufficient tolerance to allow the bearing surface 14C to be the primary locator of the assembly.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle wheel end assembly comprising:
   a bearing unit formed from steel and including a pilot surface; and
   a steering knuckle formed from aluminum and having a portion supported on said pilot surface of said bearing unit;
   wherein an anti-corrosion member is disposed on said pilot surface of said bearing unit so as to be interposed between said bearing unit and said portion of said steering knuckle when assembled so as to prevent direct contact therebetween whereby galvanic corrosion between said steel bearing unit and said aluminum steering knuckle is prevented.

2. The vehicle wheel end assembly according to claim 1 wherein said anti-corrosion member is formed from plastic.

3. The vehicle wheel end assembly according to claim 1 wherein said anti-corrosion member is formed from metal and coated with an anti-corrosive material.

4. The vehicle wheel end assembly according to claim 1 wherein said anti-corrosion member is an annular ring.

5. The vehicle wheel end assembly according to claim 1 wherein said anti-corrosion member is an annular L-shaped ring.

6. The vehicle wheel end assembly according to claim 1 wherein said anti-corrosion member is press-fit onto said pilot surface of said bearing unit.

7. The vehicle wheel end assembly according to claim 1 wherein said anti-corrosion member includes a first member and a second member.

8. The vehicle wheel end assembly according to claim 7 wherein said first member is disposed on said pilot surface and said second member is disposed on an adjacent surface of said bearing unit, said adjacent surface being generally perpendicular to said pilot surface.

9. The vehicle wheel end assembly according to claim 7 wherein said first member is formed from a first material and said second member is formed from a second different material.

10. The vehicle wheel end assembly according to claim 7 wherein said first and second members are formed from the same material.

11. A vehicle wheel end assembly comprising:
    a bearing unit formed from steel and including a pilot surface; and
    a steering knuckle formed from aluminum and having a portion supported on said pilot surface of said bearing unit;
    wherein an annular plastic member is disposed on said pilot surface of said bearing unit so as to be interposed between said bearing unit and said portion of said steering knuckle when assembled so as to prevent direct contact therebetween whereby galvanic corrosion between said steel bearing unit and said aluminum steering knuckle is prevented by said anti-corrosion member.

12. The vehicle wheel end assembly according to claim 11 wherein said annular plastic member is press-fit onto said pilot surface of said bearing unit.

13. The vehicle wheel end assembly according to claim 11 wherein said annular plastic member defines a first anti-corrosion member and said assembly includes further includes a second anti-corrosion member disposed on an adjacent surface of said bearing unit, said adjacent surface being generally perpendicular to said pilot surface.

14. The vehicle wheel end assembly according to claim 13 wherein said second anti-corrosion member is formed from plastic.

15. The vehicle wheel end assembly according to claim 13 wherein said second anti-corrosion member is formed from metal and is coated with an anti-corrosive material.

16. A vehicle wheel end assembly comprising:
    a bearing unit formed from steel and including a pilot surface; and
    a steering knuckle formed from aluminum and having a portion supported on said pilot surface of said bearing unit;
    wherein a metal member coated with an anti-corrosive material is disposed on said pilot surface of said bearing unit so as to be interposed between said bearing unit and said portion of said steering knuckle when assembled so as to prevent direct contact therebetween whereby galvanic corrosion between said steel bearing unit and said aluminum steering knuckle is prevented by said anti-corrosion member.

17. The vehicle wheel end assembly according to claim 16 wherein said metal member is press-fit onto said pilot surface of said bearing unit.

18. The vehicle wheel end assembly according to claim 16 wherein said metal member defines a first anti-corrosion member and said assembly includes further includes a second anti-corrosion member disposed on an adjacent surface of said bearing unit, said adjacent surface being generally perpendicular to said pilot surface.

19. The vehicle wheel end assembly according to claim 18 wherein said second anti-corrosion member is formed from plastic.

20. The vehicle wheel end assembly according to claim 18 wherein said second anti-corrosion member is formed from metal and is coated with an anti-corrosive material.

* * * * *